July 18, 1944.  C. UNTERBERG  2,353,773
CONTROLLABLE PITCH PROPELLER
Filed Feb. 20, 1943
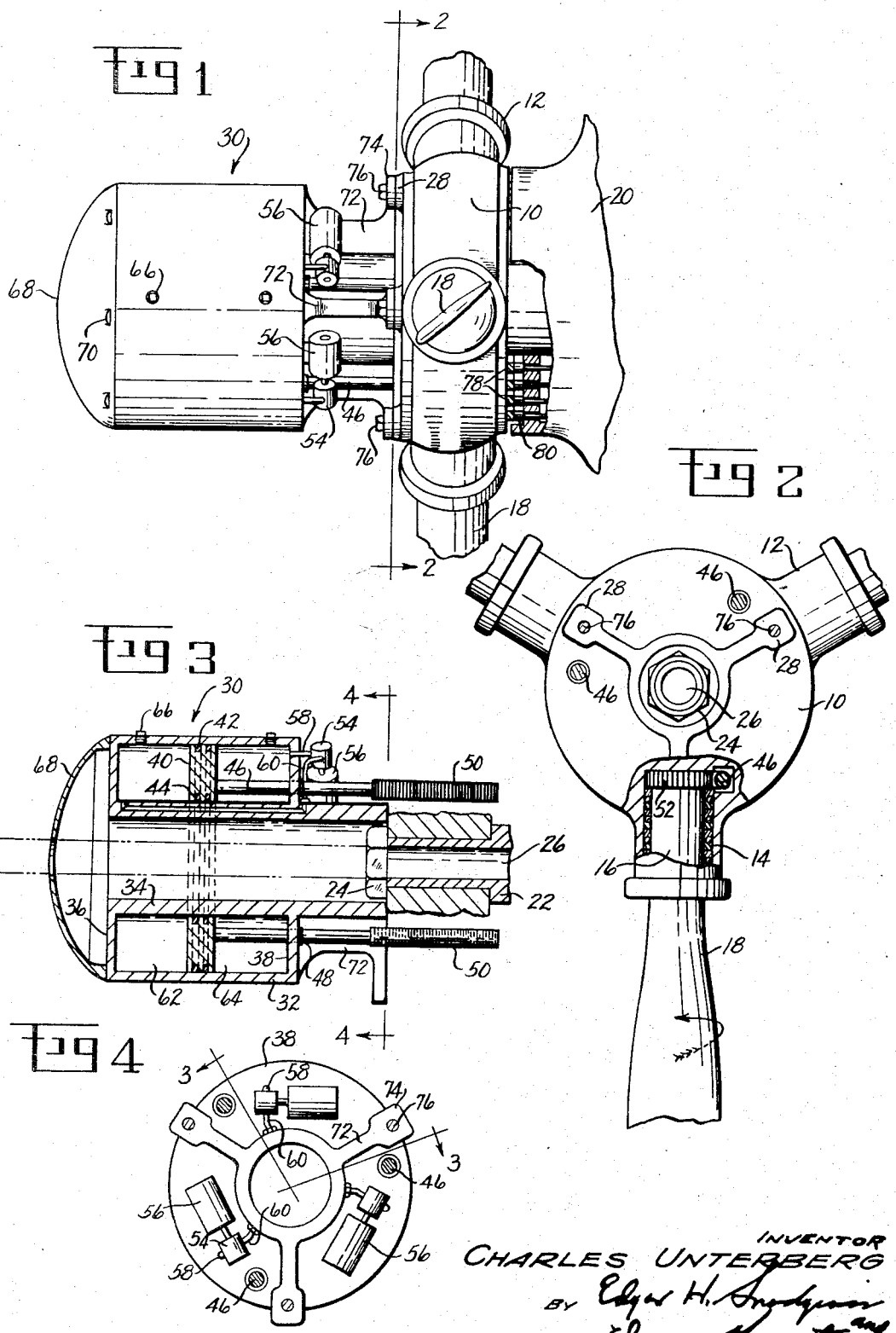
INVENTOR
CHARLES UNTERBERG
BY Edgar H. _____
_____ Kogut
ATTORNEYS Patented July 18, 1944

2,353,773

UNITED STATES PATENT OFFICE 2,353,773

CONTROLLABLE PITCH PROPELLER

Charles Unterberg, Mobile, Ala.

Application February 20, 1943, Serial No. 476,533

2 Claims. (Cl. 170—163)

(Granted under the act of March 3, 1883, as amended April 30, 1928; 370 O. G. 757)

The invention described herein may be manufactured and used by or for Government for governmental purposes, without the payment to me of any royalty thereon.

This invention relates generally to variable pitch propellers and more particularly to aircraft propellers.

An object of the invention is to provide a propeller of this kind which is of simple construction and of few parts, economically made and easily assembled and disassembled.

Another object is to provide a propeller the pitch of which may be hydraulically controlled without the necessity of providing rotating pipe joints to convey the hydraulic fluid from a non-rotating source to the blade operating means.

Another object is to provide a propeller of this type which may be used on warcraft for firing through the propeller shaft.

Another object is to provide a variable pitch propeller in which the pitch changing mechanism may be constructed as a unit and be removable without disturbing the main propeller hub on its shaft.

Other objects and meritorious features will be noted as the invention is more particularly described with reference to the drawing, wherein, Fig. 1 is a plan view of the complete propeller.

Fig. 2 is a transverse section taken at 2—2 of Fig. 1 showing the propeller with the hydraulic control unit removed.

Fig. 3 is an axial section taken at 3—3 of Fig. 4 through the hydraulic control unit.

Fig. 4 is an end view of the entire unit taken from the line 4—4 of Fig. 3.

Referring now to the drawing, a propeller hub 10 has radially extending bosses 12 for holding the anti-friction bearings 14 which rotatably support the shanks 16 of the propeller blades 18. The hub 10 is splinedly mounted on the crank shaft (not shown) which extends from the nose of an aircraft engine 20 or it may be secured to a propeller shaft 22 which may be gear driven off the engine shaft, a nut 24 is provided on the end of the propeller shaft to hold the hub in place. An opening 26 is provided whereby a machine gun may be fired through the shaft. On the forward face of the hub 10 are mounting pads 28 with tapped openings for securing the control unit to the hub.

The control unit comprises a closed container 30 made up of an outer cylinder 32 and an inner cylinder 34 joined by a front head 36 and a back head 38, the inner cylinder extending rearwardly through the back head. The parts 32, 34, 36 and 38 are shown integral although they may preferably be made separately and appropriately joined together.

An annular piston 40 is slidably fitted both to the inside of the outer cylinder 32 and to the outside of the inner cylinder 34, outer seal rings 42 and inner seal rings 44 being carried in the piston. A series of circumferentially spaced piston rods 46 extend rearwardly from the piston through stuffing boxes 48 in the rear head 38 and carry racks 50 at their rearward ends. The racks 50 are so positioned that they engage gears 52 which are attached to the inner ends of the blade shank 16, whereby axial movement of the piston 40 rotates the blades 18.

Pumps 54, each driven by a reversible electric motor 56, are mounted on the outside of the rear head 38. Pipes 58 and 60 respectively connect the pumps to the compartments 64 and 62 into which the piston 40 divides the container 30, pipe 58 being the suction and pipe 60 the discharge when the pumps rotate one direction and vice versa when the pumps are rotated oppositely. Filler plugs 66 are provided for use in supplying hydraulic fluid to the several compartments. The front of the control unit is provided with a cap 68 which is held on by screws 70. At the rear end the protruding end of the inner cylinder is reinforced by ribs 72 which widen out to form pads as at 74 to match the pads 28 on the propeller hub through which the bolts 76 extend for attaching the control unit to the propeller hub.

Slip rings 78 are insulatedly supported on the rear face of the propeller hub 10 for bringing the electric current to the several motors 56, while brushes 80 insulatedly carried on the nose of the engine 20 feed current to the rings. The switch for rotating the motors in one or the other direction for pitch increase or decrease is not shown since it forms no part of the present invention but it may be manual or automatic or a combination of both, as already well known in the prior art.

In substantially all known variable pitch propeller mechanisms, stops are provided for limiting the degree of pitch change in one or the other direction. In the present invention such stops may be carried on the piston 40, or on the piston rods 46, to mechanically arrest movement of the piston when the desired limit is reached, provided the pumps 54 are equipped with a relief valve to permit continued rotation without increasing the pressure after movement of the piston is arrested. The stops may also consist of electric switches for stopping motor rotation at a given increase or decrease in pitch. Either of these methods are, however, well developed in the art and form no part of the present invention.

The operation of the device is obvious. Since the chambers 62 and 64 are completely filled with the hydraulic fluid it follows that when the pumps 54 are rotated one direction they will pump out of the chamber 62 and into the chamber 64 whereby the piston 40 is moved forwardly and the racks 50 rotate the blades in the direction of the arrow 82. Opposite rotation of the pumps will, of course, rotate the blades oppositely.

Having shown and described an embodiment of my invention whereby the objects set forth are attained, I claim:

1. A variable pitch propeller comprising a propeller hub, radially extending bosses on said hub, blades having shanks rotatable in said bosses, and gears on the inner ends of said shanks, in combination with a self contained bodily removable control unit, concentrically secured to the forward end of said hub and comprising a fluid container made up of an outer cylinder, a concentric inner cylinder, and two heads for closing the ends of the annular space between said cylinders, an annular piston in said container dividing the annular space into two compartments, piston rods extending from said piston through the rearward head and into said hub, racks on the free ends of said rods positioned to mesh with said gears, and an electrically operated reversible pump carried on and bodily removable with the control unit, arranged for selectively pumping out of either compartment into the other.

2. A variable pitch propeller comprising a propeller hub, radially extending bosses on said hub, propeller blade shanks rotatable in said bosses, and gears on the inner ends of said shanks, in combination with a self contained bodily removable control unit, concentrically secured to the front of said hub to rotate therewith and comprising a fluid container made up of an outer cylinder, an inner cylinder concentric with the outer cylinder, and two cylinder heads for closing the ends of the annular space between said cylinders, an annular piston in said container dividing the annular space into two compartments, circumferentially spaced apart piston rods carried by said piston and extending rearwardly through the rear piston head and into said hub, racks on the free ends of said rods positioned to mesh with said gears, and reversible electric motor driven pumping means, carried on the rear piston head and removable bodily with said unit and adapted to be rotated in one direction for pumping out of the front compartment into the rear compartment, and in the other direction for pumping out of the rear compartment into the front compartment.

CHARLES UNTERBERG.